UNITED STATES PATENT OFFICE.

PAUL HÜSSY AND MAX HARTMANN, OF BASEL, SWITZERLAND, ASSIGNORS TO SOCIETY OF CHEMICAL INDUSTRY IN BASLE, OF BASEL, SWITZERLAND.

SILVER COMPOUND OF THE ACRIDIN SERIES AND A PROCESS OF MAKING SAME.

1,227,624.   Specification of Letters Patent.   Patented May 29, 1917.

No Drawing.   Application filed January 23, 1917. Serial No. 144,081.

*To all whom it may concern:*

Be it known that we, Dr. Med. PAUL HÜSSY and Dr. Phil. MAX HARTMANN, both citizens of the Swiss Republic, and residents of Basel, Switzerland, have invented new and useful Silver Compounds of the Acridin Series and a Process of Making Same, of which the following is a full, clear, and exact specification.

We have found, that valuable disinfectants of the acridin series are obtained, by acting with a soluble silver salt, on acridin dyestuffs, which may be alkylated at the acridin nitrogen, in presence of a convenient solvent, as for instance water or alcohol. The thus obtained well defined crystalline compounds possess a prominent bactericide action much superior to that of the heretofore known disinfectants with dyestuff character, as for instance the acridin dyestuffs employed as parent material or certain derivatives of other basic dyestuffs, as for instance of the methylene blue or rhodamin series. Thus, for instance, the silver salts of the acridin derivatives alkylated at the acridin nitrogen act even in a state of the greatest dilution (1:150000 to 1:180000) still growth checking, especially on streptococcus and splenitis bacilli, while the said alkylated acridin derivatives themselves show only a feeble development checking action already in dilution of 1:80000.

The toxicity of the new silver compounds is generally a trifling one and within the limits allowed for injection purposes, wherefore the new compounds are applicable for injections.

For the preparation of the new compounds can be added, for instance, to a solution as concentrated as possible of the desired acridin dyestuff salt in a convenient solvent, as for instance, water or alcohol, a likewise concentrated solution of a silver salt soluble in the employed solvent, whereupon the crystallization of the silver compound formed begins mostly after a short time and can be completed by refrigerating or, if desired, by adding a convenient precipitating agent, as for instance, ether. The separation of the new compounds is effected in the usual manner by filtration, washing and drying.

The new disinfectants constitute red to black powders, which dissolve in water with red to green coloration, in alcohol, acetic ether, glacial acetic acid and acetone with a strong fluorescence and in concentrated sulfuric acid with yellow to red colorations.

The process is illustrated by the following examples:

Example 1: 12.5 parts of the chemically pure nitrate of the acridin dyestuff methylated at the acridin nitrogen, obtained in the known manner by heating 2:7-dimethyl-3:6-diaminoacridin with methyl chlorid under pressure, are dissolved in as small a quantity as possible of boiling distilled water and hereafter a solution of 7.8 parts silver nitrate in a small quantity of water is added to the solution. The new silver compound separates immediately in the form of a crystalline tile-red precipitate; the separation is completed by cooling the mass or by allowing the same to stand for a certain time. Hereafter the precipitate is filtered off, washed first with a small quantity of ice water and afterward with alcohol and ether and dried *in vacuo*. The new silver compound constitutes in a dry state a brown-red powder, dissolving in water to red-orange solutions, in alcohol with orange-yellow coloration and strong fluorescence, in acetone, acetic ether and glacial acetic acid with yellow-green fluorescence and in concentrated sulfuric acid with yellow pure coloration; it is insoluble in ether.

Example 2: 20 parts 3:6-diamidoacridin in form of the pure base are suspended into a small quantity of hot water and to the thus obtained suspension is added, while stirring, pure nitric acid, until the dyestuff is completely dissolved. Then a solution of 17 parts silver nitrate in 50 parts water is added, whereby the black-brown silver compound separates. After the mass has been allowed to stand for a certain time, the new silver compound is isolated by filtration, washed and dried *in vacuo*. It constitutes a blue powder, which dissolves in water with green colorations and in alcohol, acetone and acetic ether with yellow-green fluorescence and in glacial acetic acid with a brown-red coloration. It dissolves in concentrated sulfuric acid to wine-red coloration of strong fluorescence; it is insoluble in ether.

Example 3: 2.6 parts diaminomethylacridinium nitrate are dissolved in a small quantity of alcohol and to the obtained solution is added a solution of 2.8 parts silver phenolsulfonate in hot alcohol. The mass is hereafter diluted with an equal volume of ether and the silver compound separated in the form of flakes is isolated by filtration. After drying, it constitutes a deep-violet powder soluble in water and alcohol with an intense yellow-green fluorescence.

Instead of those indicated in the examples, other acridin dyestuffs can be transformed into silver compounds showing analogous properties. For the silver nitrate employed in the examples other convenient silver compounds can be employed. Also the other conditions may be varied within wide limits.

What we claim is:

1. The herein described process for the manufacture of valuable disinfectants, consisting in acting on an acridin dyestuff with a soluble silver salt in presence of a solvent.

2. The herein described process for the manufacture of valuable disinfectants of the acridin series, consisting in acting on an acridin dyestuff alkylated at the acridin nitrogen with a soluble silver salt, in presence of a solvent.

3. As new products, the herein described disinfectants of the acridin series, constituting red to black powders, which dissolve in water with red to green colorations, in alcohol, acetic ether, glacial acetic acid and acetone with strong fluorescences and in concentrated sulfuric acid with yellow to red colorations, and acting still, when in solutions of great dilution, strongly growth checking on bacteria and especially on streptococcus and splenitis bacilli.

4. As a new article of manufacture the herein described silver compound of the 2:7-dimethyl-3:6-diamidoacridin methylated at the acridin nitrogen, which constitutes a brown red powder dissolving in water with a red-orange coloration, in alcohol with an orange-yellow coloration and a strong fluorescence, in acetone, acetic ether and glacial acetic acid with yellow-green fluorescences and in concentrated sulfuric acid with a pure yellow coloration and which acts still, when in solutions of great dilution, strongly growth checking on bacteria and especially on streptococcus and splenitis bacilli.

In witness whereof we have hereunto signed our names this 27th day of December, 1916, in the presence of two subscribing witnesses.

Dr. Med. PAUL HÜSSY.
Dr. Phil. MAX HARTMANN.

Witnesses:
CARL O. SPAMER,
ARMAND BRAUN.